United States Patent [19]

Richards et al.

[11] 3,968,489

[45] July 6, 1976

[54] APPARATUS FOR MONITORING THE OPERATION OF HEATER CONTROLLERS

[75] Inventors: James J. Richards; Francis A. Russell, both of Rochester, N.Y.

[73] Assignee: Eastman Kodak Company, Rochester, N.Y.

[22] Filed: Feb. 15, 1974

[21] Appl. No.: 443,066

[52] U.S. Cl. ............................. 340/417; 340/213 Q; 340/253 P; 219/502; 250/215
[51] Int. Cl.² ......................................... G08B 21/00
[58] Field of Search ............... 340/417, 259, 213 Q, 340/248 P, 253 P; 219/492, 497, 502, 501; 328/129; 250/200, 215

[56] References Cited
UNITED STATES PATENTS

| 3,541,429 | 11/1970 | Martin | 219/492 |
|---|---|---|---|
| 3,548,155 | 12/1970 | Rabindran | 219/497 |
| 3,586,830 | 6/1971 | Leitner | 219/501 |
| 3,718,924 | 2/1973 | Trubert et al. | 340/417 |
| 3,725,684 | 4/1973 | Bourgoin et al. | 219/497 |

*Primary Examiner*—John W. Caldwell
*Assistant Examiner*—William M. Wannisky
*Attorney, Agent, or Firm*—George E. Grosser

[57] ABSTRACT

Circuitry is disclosed that monitors the frequency at which a heater controller applies pulses to a heater to determine if the heater controller is operating properly. If the heater controller fails to generate a pulse in a selected interval, the circuitry generates a signal that activates an alarm and interrupts the operation of a machine that is processing material heated by the heater.

5 Claims, 5 Drawing Figures

APPARATUS FOR MONITORING THE OPERATION OF HEATER CONTROLLERS

BACKGROUND OF THE INVENTION

1. Field of the Invention

This invention relates to apparatus for monitoring the operation of heater controllers and, more particularly, to apparatus that determines if a heater controller is operating properly by monitoring the frequency at which it activates a heater.

2. Description of the Prior Art

In the prior art, it is common practice to use time proportioned control of heaters to maintain the temperature of a material they heat at a level that allows the material to be processed. Generally, a heater controller periodically activates the heater for a selected interval, and this periodic activation of the heater maintains the temperature of the material substantially at a desired temperature. More specifically, the heater controller sequentially applies pulses to the heater that have an amplitude, duration, and repetition rate determined by the characteristics of the heater. The pulse parameters are selected such that the periodic activation of the heater by the pulses results in the heater transferring enough heat energy to the material to maintain it substantially at the desired temperature. The pulses are generated by the operation of the control circuits in the heater controller which control the potential applied to a heater by its output stages.

The operation of such heater controllers is normally monitored by providing circuits in the heater controller for monitoring the operation of its control circuits. In this arrangement, an alarm is activated when the heater controller control circuits malfunction, indicating that the heater is not being properly activated. It is important that such improper heater activation be detected, since it can result in the material being heated becoming too cold, or too hot, for processing and this, in turn, can result in damage to the apparatus used to process the material. For example, if a failure in the heater controller control circuits results in no pulses being applied to the heater, the temperature of the material being processed may drop to a level where any attempt to extrude it will result in damage to the extruder screw. Conversely, if the switching circuit malfunction results in the heater being continuously activated, the temperature of the material may rise to a level that will damage the processing apparatus and also create a safety hazard.

While the prior art control circuit monitor is useful, it fails to give an indication of improper heater activation when a heater controller switching circuit is operating properly but, due to a malfunction in the output stage of the heater controller, the heater is either not being activated or is continuously activated. Obviously, failure to detect this type of malfunction can result in the same types of damage to the apparatus used to process the material being heated that result when a control circuit failure goes undetected. Furthermore, in order to add such a monitor circuit to a heater controller in which it was not originally included, circuits in the heater controller circuit must be modified. Such modifications can be relatively expensive, and they can also be a source of potential problems, since the heater controller circuit may be damaged during modification or as a result of improper modification.

SUMMARY OF THE INVENTION

The invention overcomes the problems inherent in prior art heater controller monitoring circuits by monitoring the frequency at which the actual output pulses generated by a heater controller are applied to a heater. In accordance with the invention, the output pulses of the heater controller are applied as inputs to a monitor circuit which determines if they are occurring at proper intervals. In essence, the monitor circuit times the interval between the occurrence of pulses generated by the heater controller and generates a signal when, as a result of heater controller malfunction, one of these intervals exceeds the normal interval separating the occurrence of such pulses. The signal generated by the monitor circuit may be used to activate an alarm, or interrupt the operation of a machine processing a material being heated, or both.

The advantages of the invention are obvious. Its use reduces the possibility of a machine being damaged due to failure of a heater controller, since it indicates the existence of the malfunction in the heater controller output stages, as well as indicating a malfunction of the heater controller control circuits. Additionally, such a monitor circuit may be added to a heater controller without modifying the circuits in the heater controller. To add the monitor circuit to a heater controller, it is only necessary to connect output of the heater controller as an input to the monitor circuit. Furthermore, the monitor circuit may be constructed of components that provide high reliability at a relatively low cost.

OBJECTS OF THE INVENTION

It is an object of the invention to determine the operational status of a heater controller by monitoring the signals it applies to a heater.

It is another object of the invention to determine the operational status of a heater controller by monitoring the intervals separating the occurrence of pulses it applies to a heater.

It is yet another object of the invention to activate an alarm indicating improper heater controller operation when an interval exceeding a selected limit expires after the generation of a heater controller output pulse without the occurrence of another output pulse.

It is yet another object of the invention to interrupt the operation of a machine processing a material when an interval exceeding a selected limit expires after the generation of a heater controller output pulse, that activates a heater for heating the material, without the occurrence of another output pulse.

It is a more specific object of the invention to time the intervals between the occurrence of pulses applied to a heater, compare the timed intervals with a selected limit, and generate a signal that terminates the operation of a machine processing a material being heated by the heater.

It is a still more specific object of the invention to photoelectrically detect the occurrence of pulses that are applied to a heater, time the intervals between the occurrence of the pulses applied to the heater, compare the timed intervals with a selected limit, and generate a signal that activates an alarm and terminates the operation of a machine processing material being heated by the heater when a timed interval exceeds the selected limit.

DESCRIPTION OF THE ILLUSTRATIVE EMBODIMENT

Figure 1:
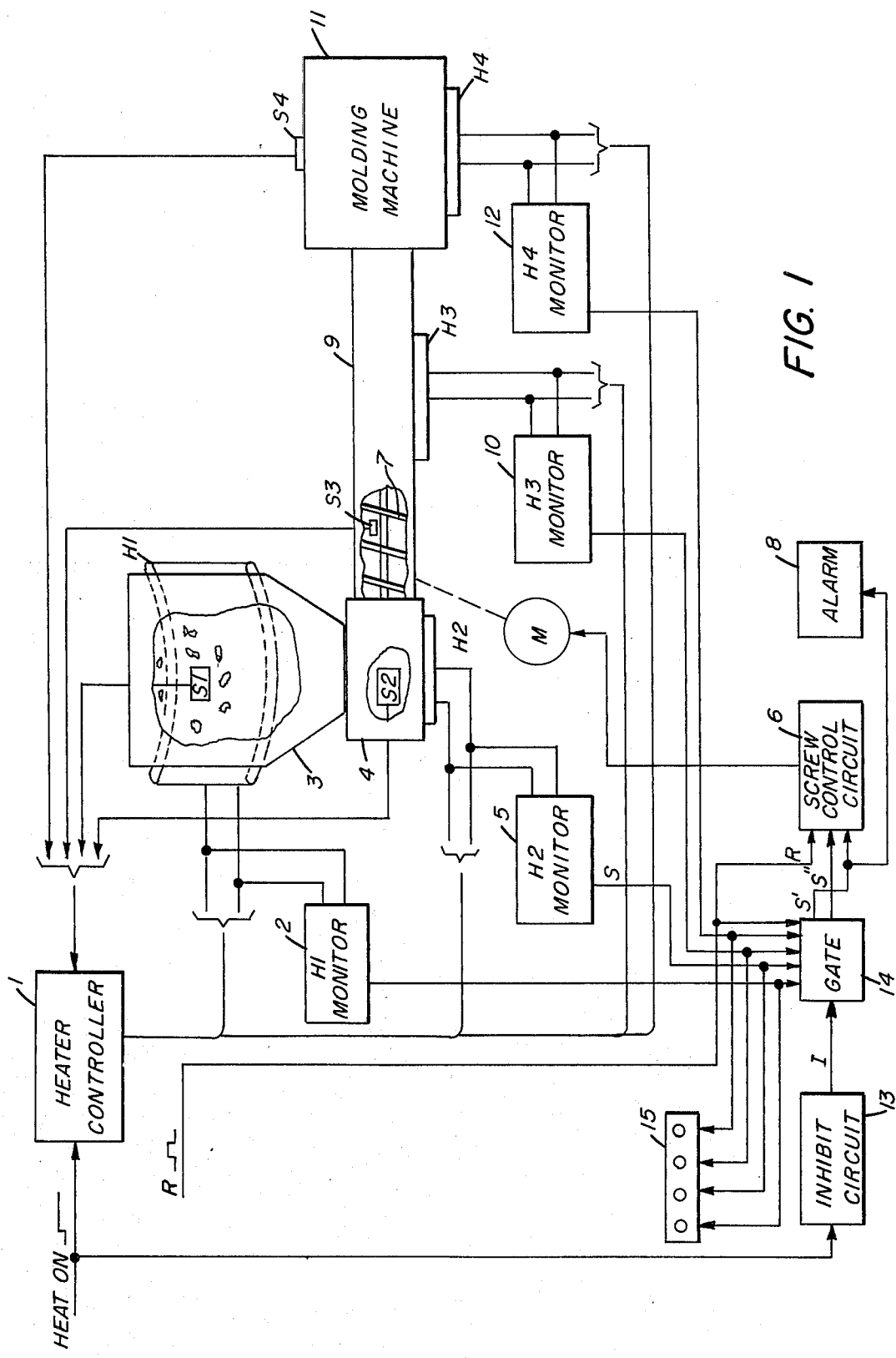
FIG. 1 shows a general schematic diagram of a system incorporating the invention that is used to control a molding machine.

The schematic diagram shown in FIG. 1 represents a system that utilizes the invention to monitor the operation of a heater controller used in conjunction with a molding machine. Obviously, this application of the invention is only illustrative, since the invention can be used with any apparatus in which time proportioned signals are used to control heaters. Generally, the system in FIG. 1 operates in the following manner. During startup, thermosensors S1, S2, S3, and S4 generate signals indicating that temperatures at various points in the apparatus are too low to begin operation of the apparatus. These thermosensor signals are applied to a heater controller 1 that is enabled by the presence of a start signal. This heater controller may be any one of numerous well-known commercially available controllers that generate time proportioned potentials useful in controlling heater operation. An example of a commercially available heater controller that is suitable for use in the system is the Barber Coleman 272P Capacitrol.

Figure 3:
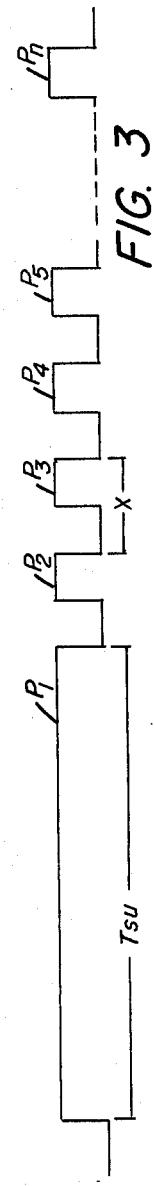
FIGS. 3 and 5 show waveforms that are useful in describing the operation of the illustrative system.

The enabled heater controller 1 responds to the low temperature signals generated by the thermosensors by applying a startup potential to each of the heaters H1, H2, H3, and H4. The startup potential applied to each of these heaters is represented by the pulse waveform P1 shown in FIG. 3. While the waveform P1 represents the pulse applied to each of the heaters, the amplitude and duration of the pulse may vary for different heaters in accordance with the operating characteristics of the heater to which it is applied. Normally, the pulse amplitude and duration are chosen to be sufficient to bring the particular location being heated to the desired operating temperature. When this desired temperature is reached at the various locations monitored by the thermosensors S1, S2, S3, and S4, the thermosensors generate signals indicating that operation of the apparatus may be initiated. The heater controller 1 responds to these signals by terminating the startup potentials P1 (FIG. 3) applied to the heater and applying a sequence of pulses, represented by the pulse waveforms P2 through $P_n$ to each of the heaters. The amplitude, duration, and intervals separating pulses in each pulse train are dependent upon the characteristics of the heater to which the pulse train is applied. In essence, the pulses in each pulse train periodically activate the heater to which they are applied to produce enough heat to substantially maintain the temperature at the location heated by the heater at the previously mentioned, desired temperature.

The previously mentioned heat on signal is also applied to an inhibit circuit 13 which generates an inhibit signal I that is applied to the gate 14. This inhibit signal I results in the gate 14 generating a signal S' that inhibits the operation of the screw control circuit 6 and activates the alarm 8. The duration of the inhibit signal I is sufficient to allow the operation of the monitor circuits to stabilize after power is applied to the system. For the duration of the inhibit signal I, the signal S'', which enables the screw control circuit 6, cannot be generated by the gate 14.

When the temperature of the material being heated is at the desired level and the inhibit signal I has terminated, the application of a start signal R to the gate 14 results in the gate terminating the signal S' and applying a signal S'' to the screw control circuit 6. The screw control circuit 6 responds to the signal S'' and the simultaneous application of the signal R by starting the motor M which rotates the screw 7.

The foregoing operations result in the material in a hopper 3 being melted and flowing into a chamber 4 where its temperature is maintained by the heater H2. The melted material in this chamber will be conveyed by the screw 7 through a heated extruder to a molding machine 11, where it is used to form a product. While the heater controller 1 is applying pulses to the heaters H1, H2, H3, and H4 at the proper intervals, the output signals of the monitor circuits 2, 5, 10, and 12 have no effect on the screw control circuit 6 or the alarm 8. The screw 7 continues to rotate, conveying the melted material in the chamber 4 to the molding machine 11.

If, during the continuing operation of the system, a heater controller output stage malfunctions, resulting in no pulses being applied to the heater H2, the monitor circuit 5 will generate a signal S after it fails to detect the occurrence of a pulse for a selected interval. This signal S, indicating the absence of activation of the heater H2 during the selected interval, results in the gate 14 terminating the signal S'' and generating the signal S' which is applied to the screw control circuit 6 and the alarm 8. The alarm 8 responds to the system S' by signalling the occurrence of a heater controller malfunction. Additionally, the signal S illuminates a lamp in a visual display 15, indicating that the heater H2 is not being properly activated. Finally, the screw control circuit 6 responds to the signal S' by terminating the operation of the motor M which, in turn, terminates the rotation of the extruder screw 7. Clearly, if such a malfunction results in the temperature of the material in the chamber 4 dropping to a level at which the material begins to solidify, continued rotation of the screw 7 can result in serious damage to the extruder.

While the foregoing has described the system operations where the heater controller 1 fails to activate a heater, it is obvious that a heater controller malfunction resulting in a heater being continuously activated will result in similar system operations. If the heater controller continuously applies a constant potential to a heater, the monitor circuit for the heater will fail to detect pulses and generate the signal S, as in the case where the heater is not activated. Furthermore, it is clear that the monitor circuits 2, 10, and 12 respond in a manner similar to the monitor circuit 5 when the heaters H1, H3, and H4, respectively, are improperly activated.

Figure 2:
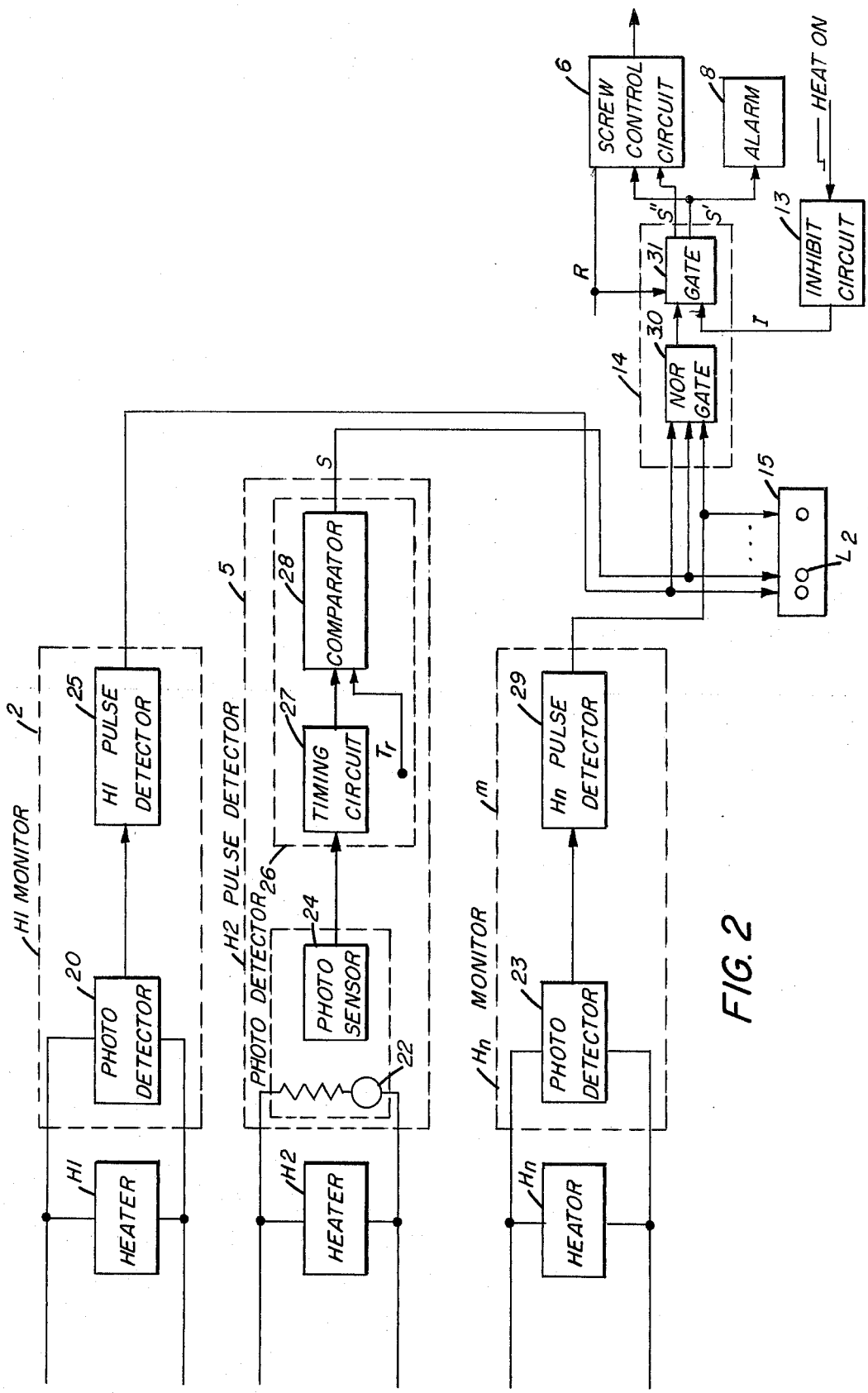
FIG. 2 shows a detailed block diagram of heater monitor circuits shown in FIG. 1.
Figure 4:

A detailed block diagram of circuitry suitable for implementing the invention is shown in FIG. 2. In this block diagram, n heaters and monitor circuits are shown to illustrate that the invention may be utilized in apparatus having anywhere from one to n heaters. In the case of the illustrative embodiment, there happens to be four heaters and, hence, for this embodiment, n equals four in FIG. 2. Since each of the monitor circuits in FIG. 2 operate in essentially the same manner, the detailed description of monitor circuit operation will be limited to describing the operation of the monitor circuit 5 for the heater H2 in order to avoid needless repetition. As described above, when the start signal is applied to the apparatus in FIG. 1, the inhibit circuit 13 generates a signal I (FIG. 4) resulting in the gate 14 generating the signal S', insuring that the motor M is not started for the duration of the inhibit signal. Referring to FIG. 2, the gate 14 is shown as including a NOR gate 30, responsive to outputs of pulse detectors 25, 26, and 29, whose output is applied as one input to an output gate 31. Another input to the output gate 31 is the inhibit signal I. The output of the gate 31 is S', while the inhibit signal I is applied as one of its inputs. When the inhibit signal I terminates, after the monitor circuit's operation has stabilized, the gate 31 will respond to another input, the start signal R, by terminating the signal S' and generating the signal S'' if the heaters are being activated properly. It will be recalled that the signal S'' enables the screw control circuit 6, resulting in the motor M being activated and, in turn, the screw 7 being rotated.

In normal operation, the heater controller applies a pulse $P_i$ (FIG. 3) to the heater H2 every $x$ seconds. As each pulse, for instance P5, is applied to the heater H2, a light source 22 is illuminated and produces a pulse of light. A photosensor 24 responds to the illumination by generating an output pulse signal that is applied as an input to a timing circuit 27 in the monitor circuit 5 for the heater H2. In essence, the change in state of the photosensor, initiated by the leading edge of the pulse, resets the timing circuit 27 which has timed the interval between this pulse P5 and the preceding pulse P4. The output of the timing circuit 27 is applied to a comparator 28 which compares the output of the timing circuit 27 with a reference signal $T_r$, representing the maximum allowable interval between the occurrence of pulses applied to the heater H2, before the timing circuit is reset. In this instance, it is assumed that the heater controller is operating properly, and that the interval between the occurrence of the pulses P4 and P5 is less than the interval represented by the reference signal $T_r$. For this situation, the comparator 28 generates no output signal. After the timing circuit 27 is reset in response to the application of P5 to the heater H2, the timing circuit begins timing the interval between the occurrence of P5 and the next pulse applied to the heater H2. As long as the heater controller is operating properly and pulses continue to be applied to the heater H2 in intervals that are less than the interval represented by the reference signal $T_r$, the comparator will generate no output signal.

Figure 5:

The waveform shown in FIG. 5 illustrates a situation in which the heater controller ceases to operate properly after the pulse P5 has been applied to the heater H2 (FIG. 2). As previously mentioned, the timing circuit 27 is reset in response to the application of the pulse P5 to the heater H2 and then begins to time the interval between the occurrence of the pulse P5 and the next pulse applied to the heater. In the case represented by FIG. 5, where the heater controller fails to generate another pulse, the output of the timing circuit 27 will not be reset, and it will continue to increase until it exceeds the reference signal $T_r$. When this occurs, the comparator 28 generates a signal S that is applied to the NOR gate 30. The gate 30 responds to the input from the comparator 28 by applying a signal to the gate 31 that results in the signal S'' being terminated and the signal S' being generated. As described above, the output S' of the gate 30 activates the alarm 8, indicating the existence of a heater controller malfunction, and the screw control circuit responds to the signal S' by generating a signal that terminates the operation of the motor M (FIG. 1) that drives the screw 7. Additionally, the output of the comparator 28 (FIG. 2) illuminates a lamp L2 in the visual display 15 that identifies the heater H2 as the heater that is not being properly activated by the heater controller.

As previously mentioned, the monitor circuit 5 (FIG. 2) operates in a similar manner if the heater controller continuously applies a constant potential to the heater H2. In this case, the light source 22 remains illuminated continuously, resulting in a constant output being generated by the photosensor 24. Consequently, in the absence of output pulses from the photosensor 24, the timing circuit 27 is not reset and its output ultimately increases to a point where it exceeds the reference input $T_r$ to the comparator 28. When this occurs, the comparator 28 generates the signal S that results in the alarm 8, light display 15, and screw control circuit 6 responding in the manner described above.

While the foregoing describes the operation of the monitor circuit 5 for the heater H2, it is obvious that the monitor circuits 2, $m$ for the heaters H1, $H_n$, respectively, operate in a similar manner. Each monitor circuit contains the same type of detector 20, 23, and pulse detector 25, 29 as the monitor circuit 5. If either of the monitor circuits 2, $m$ detects a missing heater pulse, it generates a signal that enables the NOR gate 30, resulting in the previously mentioned output signal S' from the gate 14.

The invention has been described in detail with particular reference to preferred embodiments thereof, but it will be understood that variations and modifications can be effected within the spirit and scope of the invention.

What is claimed is:

1. In combination:
  a heater;
  temperature sensing means for measuring the temperature of a material heated by said heater;
  a controller responsive to said temperature sensing means for sequentially generating heater signals that periodically activate said heater;
  means actuated by said heater signals for monitoring the rate at which said heater signals are generated, said means comprising:
    illumination means actuated by said heater signals for generating light pulses;
    a photosensor for converting the light pulses into corresponding electrical signals, and
    a timing circuit responsive to each of said electrical signals for establishing the rate of electrical signal generation;
  means responsive to the monitored rate for generating an output signal when said monitored rate is less than a selected rate; and
  an alarm responsive to said output signal for signalling the occurrence of improper controller operation.

2. In combination:
  a heater;
  temperature sensing means for measuring the temperature of a material heated by said heater;
  a controller responsive to said temperature sensing means for periodically generating pulses that are applied to said heater;

photoelectric detection means for detecting the occurrence of each of said pulses;

timing means responsive to said photoelectric detection means for generating an interval signal representing the interval separating the occurrence of said pulses;

a reference signal with a magnitude representing a selected interval;

comparator means for generating an output signal when the magnitude of said interval signal is greater than the magnitude of said reference signal;

gating means responsive to said output signal for generating a malfunction signal; and utilization means responsive to said malfunction signal for signalling the improper operation of said controller.

3. In apparatus for processing a material, the combination comprising:

a machine for processing the material;

a controller for periodically generating electrical pulses;

a heater responsive to said electrical pulses for heating said material;

means directly responsive to said pulses for monitoring the frequency of said pulses to which said heater is responsive, said means comprising:

illumination means responsive to the occurrence of each of said electrical pulses for generating a corresponding light pulse, a photosensor for converting the light pulses into corresponding electrical output signals, and a timing circuit responsive to said electrical output signals for establishing the frequency of said electrical output signals;

means for generating an output signal when the monitored frequency is less than a selected frequency; and means responsive to said output signal for terminating the operation of said machine.

4. In apparatus for processing a material, the combination comprising:

a plurality of heaters for heating said material;

a controller for periodically applying pulses to each of said heaters;

a machine for processing the heated material;

a plurality of timing circuits actuated by said pulses for timing the intervals separating the occurrence of pulses applied to each of said heaters;

a plurality of comparators, each responsive to one of said timing circuits, for generating an output signal when an interval timed by its associated timing circuit exceeds a selected interval;

gating means responsive to the output signal generated by any one of said comparators for generating a malfunction signal; and alarm means responsive to said malfunction signal for signalling the occurrence of improper controller operation.

5. The apparatus of claim 4, further comprising:

a container for storing the heated material;

an extruder for conveying said heated material from said container to said machine; and a control circuit responsive to said malfunction signal for terminating the operation of said extruder.

* * * * *